United States Patent [19]

Bolsing

[11] Patent Number: 4,997,486

[45] Date of Patent: Mar. 5, 1991

[54] METHOD OF PRODUCING A SOLID SECONDARY RAW MATERIAL CONTAINING CALCIUM SULFATE

[76] Inventor: Friedrich Bolsing, 3067 Lindhorst, Fed. Rep. of Germany

[21] Appl. No.: 539,772

[22] Filed: Jun. 18, 1990

Related U.S. Application Data

[63] Continuation-in-part of Ser. No. 328,178, Mar. 16, 1989, abandoned.

[30] Foreign Application Priority Data

Sep. 18, 1986 [DE] Fed. Rep. of Germany ....... 3631757

[51] Int. Cl.$^5$ .......................... C04B 7/24; C04B 7/38; C04B 11/24
[52] U.S. Cl. .................................... 106/778; 106/708; 106/807
[58] Field of Search ......... 106/708, 778, 807, DIG. 1; 423/168, 173, 178, 555

[56] References Cited

U.S. PATENT DOCUMENTS

| | | | |
|---|---|---|---|
| Re. 31,267 | 6/1983 | Edgar et al. | 106/284.02 |
| 2,655,430 | 10/1953 | Schiermeier | 423/555 |
| 3,855,391 | 12/1974 | Selmeczi et al. | 423/555 |
| 3,870,535 | 3/1975 | Minnick et al. | 106/118 |
| 3,929,416 | 12/1975 | Tanaka et al. | 423/555 |
| 4,108,677 | 8/1978 | Valiga | 423/555 |
| 4,136,998 | 1/1979 | Bassier et al. | 423/555 |
| 4,375,986 | 3/1983 | Pichat | 106/85 |

FOREIGN PATENT DOCUMENTS 0937392 6/1982 U.S.S.R. ............................. 106/103

*Primary Examiner*—Mark L. Bell
*Assistant Examiner*—David M. Brunsman
*Attorney, Agent, or Firm*—Sprung Horn Kramer & Woods

[57] ABSTRACT

A method of producing a solid secondary raw material that contains calcium sulfate, comprising mixing a waste hydrocarbon with at least one of a waste sulfuric acid and acid waste sulfuric-acid derivative, and combining the mixture with enough powered limestone or fly ash containing calcium carbonate to ensure that the reaction product will solidify by itself, and with at least enough water to ensure the hydration of the formed calcium sulfate. The product is useful in making Portland cement clinker, or in furnace as a fuel and/or a desulfurization additive.

9 Claims, No Drawings

METHOD OF PRODUCING A SOLID SECONDARY RAW MATERIAL CONTAINING CALCIUM SULFATE

This application is a continuation-in-part application of application Ser. No. 328,198, filed Mar. 16, 1989, now abandoned.

Portland cement is produced by burning a mixture of basic and acidic constituents equivalent to the hydraulic mortar into clinker. That specific waste materials can also be employed as substitutes in the process as a means of exploiting them and of simultaneously obtaining the advantage of the calorific value of their combustible constituents is known. Thus used and contaminated oils, used bleaching clays contaminated with organic hydrocarbons, sludge asphalts and similar materials are employed in producing clinker. This can of course be done without drawback only to the extent that the materials can without being further processed be burned in conventional plants. Used oils in primary combustion are one example. When the waste material is sticky or very viscous or when it would release toxic gases when burned, preventive measures must be taken that make it difficult to employ for burning cement clinker. This is especially true of what are called sludge asphalts, which derive from used-oil refineries and consist on the average of up to 62 to 66% of such organic compounds as oils and resinous polymerization products and of up to 22 to 66% of to some extent chemically bonded sulfuric acid. The consistency of sludge asphalts extends from liquid to solid. They cannot be mixed with water.

To facilitate handling them, dispersion by chemical reaction (DCR) with calcium oxide to convert them into solid powdered preparations has already been proposed (German Patent 2 533 790). The mineral proportion of such powders, however, is very high and their calorific value very low.

The same is true of the neutralization of sludge asphalts by adding aqueous solutions of slaked lime or calcium carbonate. In this case the water employed must be reprocessed to conform with sewage regulations.

Continuously mixing the sludge asphalt with alkaline hydroxides at high temperatures and pressures has accordingly also been proposed (German AP 2 505 373). Procedures of this type, however, demand complicated equipment and expensive auxiliaries, and the calorific value of the reaction products is still low.

The object of the invention is to generate a solid secondary raw material that contains calcium sulfate as a hardening compound and that can be employed for subsequent technological exploitation, in combustion systems or to obtain Portland cement clinker for example, from waste that contains sulfuric acid.

This object is attained in accordance with the invention by mixing waste hydrocarbons with waste sulfuric acids and/or with acid waste sulfuric-acid derivatives and by converting the mixture with enough of an aqueous suspension of powdered limestone and/or fly ash that contains calcium carbonate to ensure that the reaction product will solidify by the formation of calcium sulfate by itself.

The water added is in at least that amount necessary to prevent release of $SO_2$ from the treated waste.

Waste hydrocarbons appropriate for the purposes of the invention are used oil, contaminated used oils, polychlorinated biphenyls, oils containing dioxins, asphaltic wastes, used bleaching clays contaminated with hydrocarbons, macromolecular wastes, and the contents of oil lagoons.

The necessary sulfuric acid or its derivatives, mainly sulfonic acids and monoalkyl and monoaryl sulfates, are also preferably obtained from the waste sector. The group also includes the aforementioned acid tars, which are of particular importance in that they already contain waste hydrocarbons although they are preferably treated in accordance with the invention with the other aforementioned waste hydrocarbons and are accordingly employed only to the extent necessary to convert the liquid or oily waste hydrocarbons into a solid product by forming calcium sulfate.

Powdered limestone and/or the calcium-carbonate containing fly ash deriving from the cement and lime industry or from other technologies is employed for neutralization or to obtain the calcium sulfate. No harm will be done if the calcium-carbonate containing powder also contains inert or hydraulically bonding constituents that become constituents of the clinker in the cement-making process.

Precisely how much of the waste sulfuric acid or its derivatives and of the calcium-carbonate containing neutralization agent will be necessary to ensure that the hyrocarbon-containing wastes will solidify due to the formation of calcium sulfate in the form of the hemihydrate, dihydrate, decahydrate depends on the constitution and composition of the wastes. Since it is practical to use waste-hydrocarbon or acid constituents with a consistency that will ensure that their mixture is relatively liquid and will accordingly mix more effectively with the suspension of calcium-carbonate containing substances, the formation of carbon dioxide, which has caused so many problems in the past, will be lower and easier to manage technologically.

If the hydrocarbon constituents and the sulfuric acid constituents will not, due to their chemical nature, readily mix homogeneously, surfactants, petroleum sulfonate for example, that resist sulfuric acid can be employed for the neutralization.

The water that occurs in the waste hydrocarbons and in waste products that contain sulfuric acid must also be taken into account when calculating the volume of water permissible for the solidification or requisite for the hydration of the calcium sulfate in multiphase systems. In any event, the amount of sulfuric acid and its derivatives and of the powdered limestone and/or calcium-carbonate containing fly ash will be calculated to ensure that the reaction product will solidify spontaneously once it has been thoroughly mixed. The amounts depend of course on the composition of the particular wastes. They can easily be determined manually by conventional methods. Adding an excess of the basic constituents is permissible but decreases the calorific value.

As stated hereinabove, the water added also serves to inhibit or even prevent relase of $SO_2$ from the material to be treated and thus reduces environmental pollution. The amount of water needed for such prevention can easily be ascertained by simple trials since it will vary somewhat with the starting material and its initial water content.

Solidification times can be adjusted by varying the ratios of components. This factor is significant when the reaction product is to be shaped into granules before it can solidify, a form that substantially facilitates handling. The material can be shaped into granules or pellets by rolling, in a drum or on a plate for example, or by extrusion. This shaping results in almost dustless secondary raw materials that are easy to ship and measure out.

If the properties of the waste material require it, the resulting granules can be dusted with an anti-caking agent before they solidify in order to prevent them from caking up later. Using hydrophobed calcium oxide or hydroxide for this purpose will accelerate solidification subsequent to shaping.

The secondary raw materials in accordance with the invention can be employed not only to produce Portland cement clinker but also as a fuel or desulfurization additive in combustion plants. In this case as well the invention eliminates the drawback of the aforesaid wastes being difficult to handle in themselves and difficult to process. When, however, they are converted by the method in accordance with the invention into a calcium-sulfate containing solid secondary raw material, they can be burned along with the other materials with no problem, even when they contain such problematic materials as halogenated aromatics. Using the wastes as desulfurization additives exploits their inherent energy while simultaneously introducing the basic desulfurization constituents into the combustion process.

The following examples will illustrate the invention:

EXAMPLE 1

A homogeneous mixture of 1 part by weight of an asphaltic waste hydrocarbon obtained from an oil lagoon and 0.2 parts by weight of an 80% waste sulfuric acid is added to a suspension of 0.5 parts by weight of cement fly ash and 0.r parts by weight of powdered limestone in 0.3 parts by weight of water while the suspension is being stirred. The reaction product is extruded from a press with a perforated die. The pellets are allowed to stand in the air, and solidify in approximately two hours. The resulting solid secondary raw material producing Portland cement clinker contained 43% minerals, 68% of which was $CaSO_4 \cdot 2H_2O$, and its calorific value was 4600 kcal/kg. The addition of approximately 2 parts by weight of calcium oxide accompanied by 1% of hydrophobing agent results in surface solidification in as soon as half an hour.

EXAMPLE 2

1 part by weight of used bleaching clay deriving from the manufacture of petroleum jelly and containing 30 to 35% by weight of hydrocarbons is homogenized with 1.5 parts by weight of water. 2 parts by weight of powdered limestone are added and the mixture is again homogenized. Added to this pulpy mixture while it is being stirred are 2 parts by weight of sludge asphalt deriving from the processing of used oil. The result is a bulk material that can be plastically deformed by kneading or beating in a high-speed mixer. It is also possible to control its consistency by adding water subsequent to neutralization. It is shaped into pellets in an extruder and into granules in a roller drum with rotating blades.

The granules can be prevented from caking by dusting them with slightly hydrophobed calcium oxide. The final product is left to dry and solidify in the air. The result is a solid granulate with a $CaSO_4 \cdot 2H_2O$ content of 13% and a calorific value of 4550 kcal/kg.

EXAMPLE 3

4 parts by weight of cement fly ash, 2 parts by weight of used bleaching clay, and 2 parts by weight of water are homogenized. 1 part by weight of sludge asphalt is added while the mixture is being stirred. The level of bleaching clay can be varied over a wide range. The remaining procedure is as described in Example 2 and results in a solid granulate with a $CaSO_4 \cdot 2H_2O$ content of 4% and a calorific value of 1650 kcal/kg.

EXAMPLE 4

4 parts by weight of cement fly ash and 1.5 parts by weight of water are homogenized. A homogenous mixture of 0.5 parts by weight of sludge asphalt and 0.5 parts by weight of used oil are added. The remaining procedure is as described in Example 2 and results in a solid granulate with a $CaSO_4 \cdot 2H_2O$ content of 6% and a calorific value of 1700 kcal/kg.

EXAMPLE 5

A previously prepared mixture of highly viscous waste oil contaminated with polychlorinated biphenyls and of a sludge asphalt containing approximately 50% acid and accounting for approximately 15% of the mixture is homogenized in a plowshare mixer with 1.4% parts by weight of filter dust deriving from the lime industry, mainly consisting of powdered limestone and moistened with 10% of its weight of water. A granulate forms spontaneously after a few minutes of mixing and solidifies rapidly when dusted with hydrophobed calcium oxide. This secondary raw material has a calorific value of approximately 2400 kcal/kg, making it appropriate for desulfurizing flue gas in a fluidized bed. The advantages of this type of exploitation are not only the utilization of organic wastes as a fuel while simultaneously utilizing the basic carrier as a desulfurization material but especially in that even hazardous organic wastes can be safely eliminated in the basic environment. The inorganic constituents intercepted subsequent to combustion can be completely returned to the reprocessing procedure.

EXAMPLE 6

5.6 parts by weight of a residual heavy oil are mixed with 5.6 parts by weight of a carbon-containing ash with about 20% combustible constituents and derived from a dry-fueled power plant and 0.5 parts by weight of waste sulfuric acid added. The mixing worked with a kneader into a mixture of 4.2 parts by weight of powdered limestone and 0.5 parts by weight of water. The reaction mixture is easy to granulate, and the granules solidify rapidly when dusted with calcium oxide. This secondary raw material can be employed as an energy base in power plants and supplies, as the result of tis percentage of powdered limestone, a readily melting slag with a burning loss of less than 5%. It is an appropriate additive for concrete.

It will be understood that the specification and examples are illustrative but not limitative of the present invention and that other embodiments within the spirit and scope of the invention will suggest themselves to those skilled in the art.

What is claimed is:

1. A method of producing a solid secondary raw material that contains calcium sulfate, comprising mixing a waste hydrocarbon with at least one of a waste sulfuric acid and acid waste sulfuric-acid derivative, and combining the mixture with enough powdered limestone or fly ash containing calcium carbonate to ensure that the reaction product will solidify by itself, and with at least enough water, added prior to or concurrent with the addition of said powdered limestone or fly ash, to ensure the hydration of the formed calcium sulfate and to prevent release of $SO_2$.

2. A method according to claim 1, wherein the mixture is combined with an aqueous suspension of powdered limestone.

3. A method according to claim 1, wherein the product is shaped into pellets or granules before it solidifies.

4. A method according to claim 3, wherein the resulting pellets or granules are dusted with an anti-caking agent before they solidify.

5. A method according to claim 4, wherein hydrophobed calcium oxide or calcium hydroxide is employed as the anti-caking agent.

6. A method according to claim 1, wherein a sulfuric acid resistant surfactant is included during the initial mixing.

7. A method according to claim 1, wherein the waste hydrocarbon comprises a used oil, contaminated used oil, polychlorinated biphenyl, oil containing dioxins, asphaltic waste, used bleaching clay contaminated with hydrocarbons, macromolecular wastes or the contents of an oil lagoon.

8. A method according to claim 1, wherein the waste sulfuric acid or waste sulfuric-acid derivative is a sludge asphalt.

9. The product produced by the process comprising mixing a waste hydrocarbon with at least one of a waste sulfuric acid and acid waste sulfuric-acid derivative, and combining the mixture with enough powdered limestone or fly ash containing calcium carbonate that the reaction product will solidify by itself, and with at least enough water, added prior to or concurrent with the addition of said powdered limestone or fly ash, to ensure the hydration of the formed calcium sulfate and to prevent the release of $SO_2$.

* * * * *